Nov. 13, 1962
L. M. MACE
3,063,064
APPARATUS FOR CONVERTING THE AFTER COMPARTMENT OF AN AUTOMOBILE
Filed Oct. 25, 1960
2 Sheets-Sheet 1
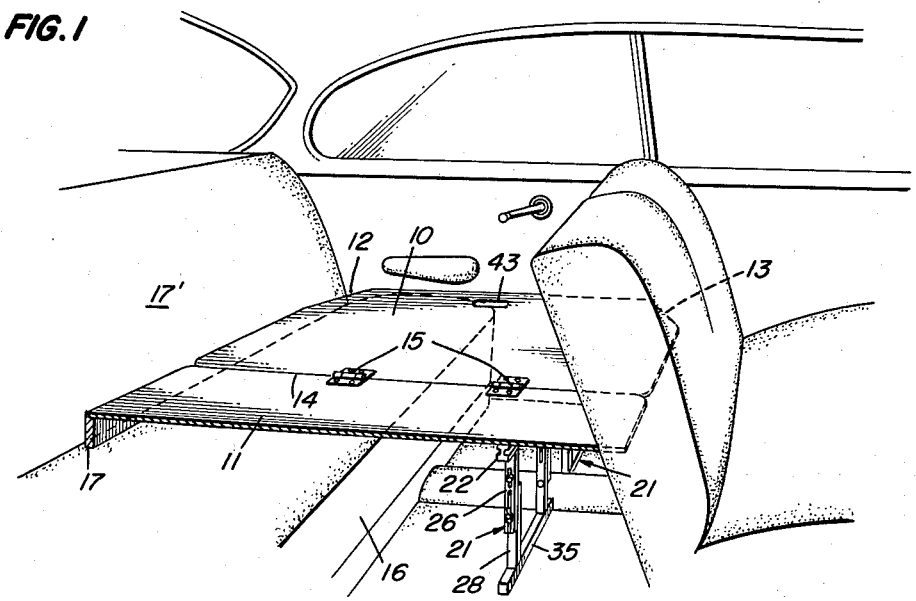
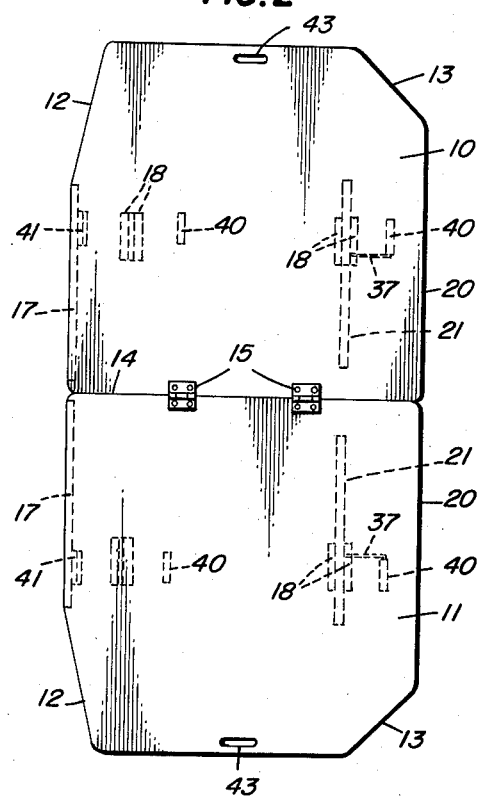
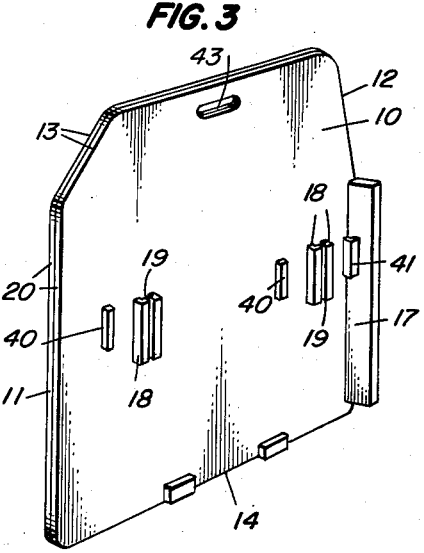
INVENTOR.
Luther M. Mace
BY
ATTORNEY Nov. 13, 1962
L. M. MACE
3,063,064
APPARATUS FOR CONVERTING THE AFTER COMPARTMENT OF AN AUTOMOBILE
Filed Oct. 25, 1960
2 Sheets-Sheet 2
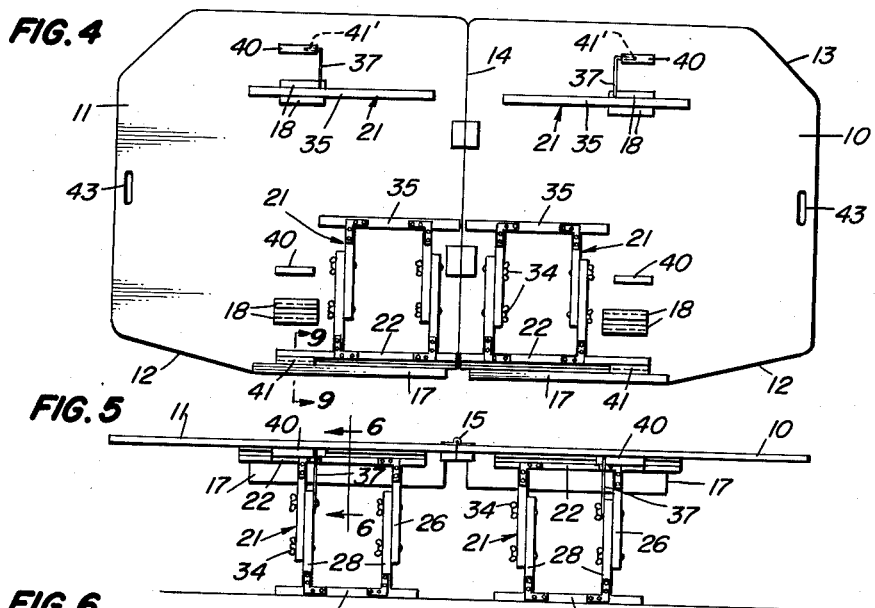
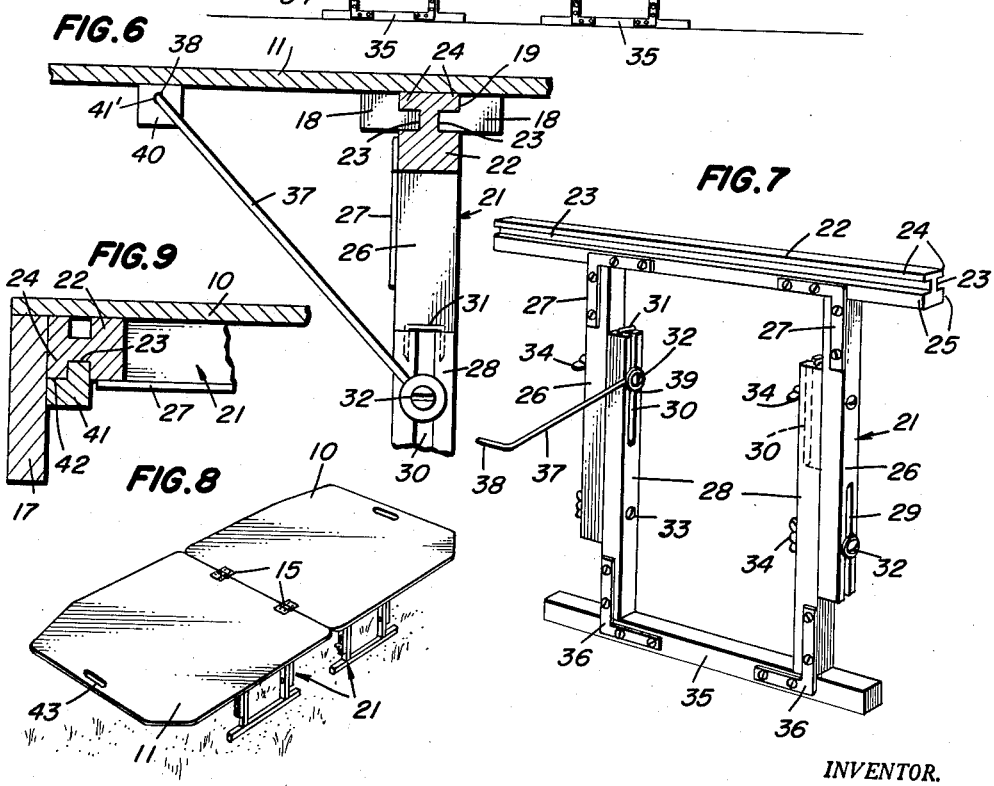
INVENTOR.
Luther M. Mace
BY
B. P. Fishburne, Jr.
ATTORNEY

United States Patent Office 3,063,064
Patented Nov. 13, 1962

3,063,064
APPARATUS FOR CONVERTING THE AFTER COMPARTMENT OF AN AUTOMOBILE
Luther M. Mace, 34 Wren St., Barnwell, S.C.
Filed Oct. 25, 1960, Ser. No. 64,924
3 Claims. (Cl. 5—94)

My invention relates to apparatus for converting the after compartment of an automobile having a front and rear seat into a safe play or sleeping space for children, or into a sleeping space for an adult, or a convenient storage space for the goods of salesmen, delivery men or the like.

A further object of the invention is to provide apparatus of the mentioned character in the nature of a foldable platform having readily adjustable and detachable leg means, and being very easy to install within or remove from the automobile without the use of any tools.

A further object is to provide a device of the above-mentioned character which may also serve outside of the automobile as a lightweight handy table for picnics or the like.

Another object is to provide apparatus of the above-mentioned character which when folded for storage in the trunk of the automobile or the like is highly compact and substantially flat so as to occupy a minimum of space in the trunk.

Still another object is to provide a device of the mentioned character which is highly economical to manufacture from inexpensive materials, and which lends itself particularly well to selling in the knocked-down or kit form, so as to be finally assembled prior to use by the purchaser.

Other objects and advantages of the invention will be apparent during the course of the following description.

In the accompanying drawings, forming a part of this application and in which like numerals are employed to designate like parts throughout the same, FIGURE 1 is a perspective view, partly in section, of apparatus according to the invention for converting the after compartment of an automobile, FIGURE 2 is a top plan view of the apparatus unfolded for use, FIGURE 3 is a perspective view of the apparatus folded for storage, parts omitted, FIGURE 4 is a bottom plan view of the apparatus, FIGURE 5 is a side elevation of the same, FIGURE 6 is an enlarged fragmentary vertical section taken on line 6—6 of FIGURE 5, FIGURE 7 is a perspective view of a detachable adjustable leg unit for the apparatus, FIGURE 8 is a perspective view of the apparatus set up for use as a picnic table or the like, FIGURE 9 is an enlarged fragmentary vertical section taken on line 9—9 of FIGURE 4.

In the drawings, wherein for the purpose of illustration is shown a preferred embodiment of the invention, the numerals 10 and 11 designate companion flat platform sections formed of plywood or the like and being each generally rectangular and identical in shape so as to form together in the open or extended position a continuous horizontal platform for the entire after compartment of an automobile between the front and back seats and the sides thereof, at the approximate elevation of the back seat cushion. The outer corner portions of the platform sections 10 and 11 are suitably trimmed or contoured at 12 and 13 to properly fit the corner configuration of the after compartment of the particular automobile within which the apparatus is to be used. In this connection, it may be preferable to form the platform sections 10 and 11 initially rectangular and allow the customer to trim the corners thereof at 12 and 13 to custom fit the device to the particular model or make of automobile.

The inner meeting longitudinal edges 14 of platform sections 10 and 11 are securely and permanently hingedly connected by suitable spaced hinges 15, as shown, and such hinges may be applied to the upper faces of the platform sections 10 and 11 with screws or with nut and bolt means, or the like. If preferred, a single long piano-type hinge may be employed instead of the spaced hinges 15, as shown.

As shown in FIGURE 1, the extended or unfolded platform composed of the platform sections 10 and 11 is adapted to rest directly upon the rear seat cushion 16 of the automobile. To compensate for the fact that the seat cushion 16 slopes downwardly somewhat toward its rear side, a transversely elongated shallow vertical spacer rail 17 is dependingly rigidly secured to each platform section 10 and 11 adjacent the rear edge thereof, and extends throughout a major portion of the length of such rear edge, as shown. These spacer rails 17 engage the low rear portion of the back seat cushion 16 adjacent the seat back 17' and maintain the platform sections 10 and 11 horizontal or level during use.

Means are provided to detachably mount vertically adjustable leg units upon the lower sides of platform sections 10 and 11, and such means comprises on each platform section forward and rear companion pairs of spaced opposed guide or anchor blocks 18, which are L-shaped in cross section as best shown in FIGURES 3 and 6. Each pair of the blocks 18 thus affords between them a substantially T-shaped passage 19 directly below the platform section 10 or 11. The blocks 18 of each pair are parallel and the blocks and their T-shaped passages 19 are parallel to the rails 17 and parallel to the forward transverse edges 20 of the platform sections. The forwardmost pairs of anchor blocks 18 are disposed near and inwardly of the edges 20 and at or near the transverse centers of the platform sections 10 and 11. The rearmost pairs of blocks 18 are likewise spaced near and inwardly of the spacer rails 17 and in longitudinal alignment with the forward pairs of blocks 18.

The apparatus further comprises adjustable and detachable leg units for coaction with the pairs of anchor blocks 18, and one such leg unit is shown in its entirety in FIGURE 7. I contemplate providing four leg units with each apparatus or kit, one pair of the leg units to be utilized for converting the after compartment of an automobile, and all four leg units being utilized when the apparatus is employed as a picnic table or the like as illustrated in FIGURE 8.

With continued reference to the drawings and particular reference to FIGURE 7, each leg unit 21 comprises a top horizontal slide rail 22 of approximate I-shape in cross section thereby providing side parallel longitudinal grooves 23 and upper and lower horizontal longitudinal flanges 24 and 25 above and below such grooves. It may be seen now that the slide rail 22 of each unit 21 is adapted for reception longitudinally and slidably within the T-shaped passage 19 afforded by a pair of the anchor blocks 18 previously described.

Each leg unit 21 further comprises an outer pair of vertical leg sections 26, depending rigidly secured to the horizontal slide rail 22 inwardly of the ends thereof by rigid L-shaped mounting brackets 27, rigidly secured to corresponding side faces of the leg sections 26 and rail 22 by means of screws or the like. Each leg unit 21 further comprises a pair of inner leg sections 28, slidably abutting the inner faces of the vertical leg sections 26 and being of approximately the same length as the latter and adjustable longitudinally relative thereto. To facilitate this adjustment, the outer leg sections 26 are longitudinally slotted at 29 through their lower ends, while the inner leg sections 28 are similarly longitudinally slotted at 30 through their upper ends. The open ends of the leg slots 29 and 30 may be conveniently permanently closed by U-shaped brads 31, as shown. The slots 29 and 30 are preferably of equal length and extend for substantial distances lengthwise of the leg sections for providing adequate adjustment. Suitable bolts 32 engage through the respective slots 29 and 30 and through openings 33 formed in the adjacent unslotted portions of the companion leg sections 26 and 28. It should now be apparent that the leg sections 26 and 28 are longitudinally adjustable or extensible and may readily be locked in the selected adjusted position by merely tightening winged nuts 34, carried by the several transverse bolts 32, as shown in the drawings.

Each leg unit 21 further comprises a bottom horizontal elongated foot rail 35 parallel to the upper slide rail 22 and perpendicular to the leg sections 26 and 28 and rigidly secured to the latter by a pair of rigid angle brackets 36, preferably identical to the previously described brackets 37. The foot rail 35 is preferably somewhat shorter than the slide rail 22 and projects some distance beyond each of the leg sections 28 as shown in FIGURE 7. The elements 22, 26, 28 and 35 are all adapted to be formed from standard square or substantially square wood stock. In this connection, I contemplate for the sake of economy of manufacturing to fabricate the apparatus entirely from wood except for the metal hardware elements. However, it is entirely feasible to make the apparatus from plastics material, aluminum or any other suitable material found desirable. I do not wish to limit the invention to the use of any particular material.

Each leg unit 21 further comprises a preferably wire brace 37 of sufficient length to connect the leg unit diagonally with one of the platform sections 10 or 11 in a manner to be described. This brace 37 has a transverse extension 38 at its free end and an eye 39 at its opposite end, pivotally engaging one of the upper bolts 32 of the leg unit 21, FIGURE 7.

Near and spaced from each pair of anchor blocks 18 on the lower faces of the platform sections 10 and 11 is rigidly mounted a brace anchor block 40, such block being parallel to the blocks 18 and provided in one end with an aperture 41', FIGURE 6, adapted to receive therein the transverse extension 38 of the brace 37 carried by one leg unit 21.

Rigidly secured to the inner face of each spacer rail 17 near and inwardly of its outer end is another anchor block 41, L-shaped in cross section and thereby providing a horizontal passage 42 adjacent each rail 17 and the bottom face of each platform section adapted to receive one of the longitudinal flanges 24 of one slide rail 22 of one leg unit. As shown in FIGURES 3 and 4, a pair of the leg units 21 while not in use and while disposed on their sides may be stored flat against the bottom faces of platform sections 10 and 11 by engaging the flanges 24 slidably through the passages afforded by the L-shaped blocks 41.

The platform sections 10 and 11 are preferably provided near and inwardly of their outer ends with elongated openings 43, which register when the apparatus is folded, FIGURE 3, so as to provide convenient carrying means for the folded apparatus.

The apparatus is installed and used in the following manner:

The front seat of the automobile is adjusted to the extreme forward position. In the case of a four door sedan, the left hand rear door is now opened. The apparatus in the folded position, FIGURE 3, is now taken from storage in the trunk and the leg units are detached therefrom and placed aside. With the two platform sections 10 and 11 folded upon each other, the apparatus is maneuvered into the rear seating compartment. This is preferably done by arranging the folded platform vertically while the hinged edges 14 are directed toward the person installing the apparatus and with the front edges 20 uppermost. When the folded platform is in the after compartment, it is turned counterclockwise until the platform is in the horizontal plane, and then lowered to the level of the rear seat cushion. The left hand section of the platform will now be resting upon the right hand section. While the right hand supports the front edge of the folded platform, the left hand is used to unfold the left hand section. As this is done, the platform is shifted across to the right hand side of the vehicle, allowing the left hand platform section to reach the horizontal plane on its side of the after compartment.

The front edge of the unfolded platform is then supported by the left hand, while the left hand leg unit 21 is inserted slidably within the passage 19 of the adjacent pair of anchor blocks 18. This leg unit 21 is freely adjustable laterally to avoid engagement with the drive shaft tunnel or hump at the transverse center of the automobile floor. The leg unit 21 is now adjusted to the proper elevation and locked in the selected adjusted position for maintaining the apparatus level or horizontal.

The right hand leg unit 21 is now installed from the right hand side of the automobile in a similar manner.

For automobiles with two doors, the installation is substantially the same, except that the seat backs of the front seat are tilted forward, as when a person is entering the back seating compartment. The front seat of the automobile is then adjusted backward as desired by the driver after the apparatus has been installed.

For removal of the apparatus, the above-described steps are simply executed in a reverse order.

As shown particularly in FIGURE 8, the apparatus is ideally suited to serve as a low picnic table apart from the automobile. To facilitate this use, it is merely necessary to install the four adjustable leg units 21 on the bottoms of platform sections 10 and 11, in the described manner and utilizing the four sets of anchor blocks 18 previously described. Each leg unit 21 is merely slid into place longitudinally of the T-shaped passage 19, and each diagonal brace 37 has its transverse end 38 introduced into the aperture 41' of the adjacent block 40. The leg units are adjusted to the desired height, and the picnic table is ready for use.

Incidentally, it is believed to be unnecessary to utilize the diagonal braces 37 in the manner shown in FIGURE 6 when the apparatus is installed in the automobile after compartment. That is to say, the automobile installation should have adequate stability afforded by the front and back seats and the pair of leg units 21 without bringing the braces 37 into engagement with the apertures 41'. However, if preferred for added safety, the user may employ the braces when the apparatus is installed in the automobile.

As an additional feature of the invention, four extra leg units of increased height or adjustability may be furnished with the apparatus to enable the same to be used as a table of full or normal height, as for example a card table or the like. Such additional leg units are optional and if they are furnished will be identical with the leg units 21 except for the added height and added vertical adjustability.

Although omitted from the drawings for the purpose of simplification, it should be understood that a conventional air inflatable mattress or like cushioning means is employed on top of the extended platform, FIGURE 1, to fully convert the automobile after compartment into sleeping quarters for children or possibly an adult. If the apparatus is employed merely as a storage platform for the goods of a salesman or the like, there is no need for the mattress and the same is omitted.

As should now be apparent, my simplified, sturdy and economical apparatus renders it very easy to convert the after compartment of any automobile into a safe play or sleeping compartment for children during traveling. The apparatus is one which will not be "outgrown" by the growing children and affords adequate space for more than one child or for a sleeping adult. Most conventional automobile cribs and the like possess the disadvantage of being able to accommodate children only until they are one or two years of age, whereas the present apparatus may readily accommodate them up to the age of eight or ten years.

When the apparatus is removed and folded for storage as shown particularly in FIGURE 3, it is readily carried by the handle means provided by the registering openings 43. The two leg units 21 normally employed in the automobile installation, FIGURE 1, are stored flat against the undersides of the platform sections 10 and 11 by the described engagement of the rails 22 with the L-shaped blocks 41, see FIGURES 4 and 9 illustrating this storage arrangement.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. Apparatus for converting the after compartment of an automobile into play or sleeping quarters for children, said after compartment including a back seat cushion and a floor having a center drive shaft hump forwardly of the back seat cushion, said apparatus comprising at least a pair of longitudinally hingedly connected relatively thin lightweight panel sections adapted when unfolded to substantially span the after compartment horizontally above the back seat cushion and floor with rear portions of the panel sections overlying the back seat cushion and forward sections thereof overlying said floor in spaced relation thereto, said panel sections being subject to flexure under the weight of children thereon, depending transverse support rails secured to the rear edges of the panel sections and extending for major portions of the widths thereof and bearing upon the back seat to support the rear edges of the panel sections and preventing bending thereof, intermediate portions of the panel sections bearing upon the back seat cushion, transversely extending aligned channel members fixedly secured to the bottoms of said panel sections forwardly of the back seat cushion and above said floor and on opposite sides of said drive shaft hump, transverse elongated rigid horizontal slide rails slidably engaging through said channels and extending beyond opposite ends of the channels and contacting the bottom sides of the panel sections over a major portion of the width thereof to support the latter and resisting flexure of the panel sections under the weight of children thereon, vertically extensible rigid leg means underlying and secured to each slide rail and supporting the latter along a major portion of its length intermediate its ends, and a transversely elongated horizontal rigid foot rail secured to the bottom of each extensible leg means and underlying the slide rail in spaced parallel relation thereto and engaging said floor over a major portion of the width thereof on each side of said hump, said slide rails, leg means and foot rails constituting rigid generally rectangular transversely wide and longitudinally narrow support units beneath said panel sections and between the latter and said floor and being bodily adjustable transversely of the panel sections by sliding within said channel members.

2. The invention as defined by claim 1, and wherein said leg means secured to each slide rail is a transversely spaced pair of vertically extensible rigid leg sections, adjustable means to releasably secure the leg sections in desired extended positions, and diagonal brace means interconnecting the panel sections and each said support unit to stabilize the latter.

3. The invention as defined by claim 1, and additional holding means on the bottom faces of the panel sections detachably engageable with said slide rails to facilitate storing said support units in flat coplanar relation with the bottoms of said panel sections.

References Cited in the file of this patent
UNITED STATES PATENTS

| | | |
|---|---|---|
| 432,425 | Moan | July 15, 1890 |
| 2,409,934 | Haggard et al. | Oct. 22, 1946 |
| 2,460,712 | Peterson | Feb. 1, 1949 |
| 2,711,545 | Moore | June 28, 1955 |
| 2,832,657 | Cariaga | Apr. 29, 1958 |
| 2,837,389 | Brown | June 3, 1958 |

FOREIGN PATENTS

| | | |
|---|---|---|
| 34,887 | Austria | Oct. 26, 1908 |